June 11, 1940.   C. M. HINES   2,203,907
MOTOR CONTROL SYSTEM
Filed Nov. 25, 1938
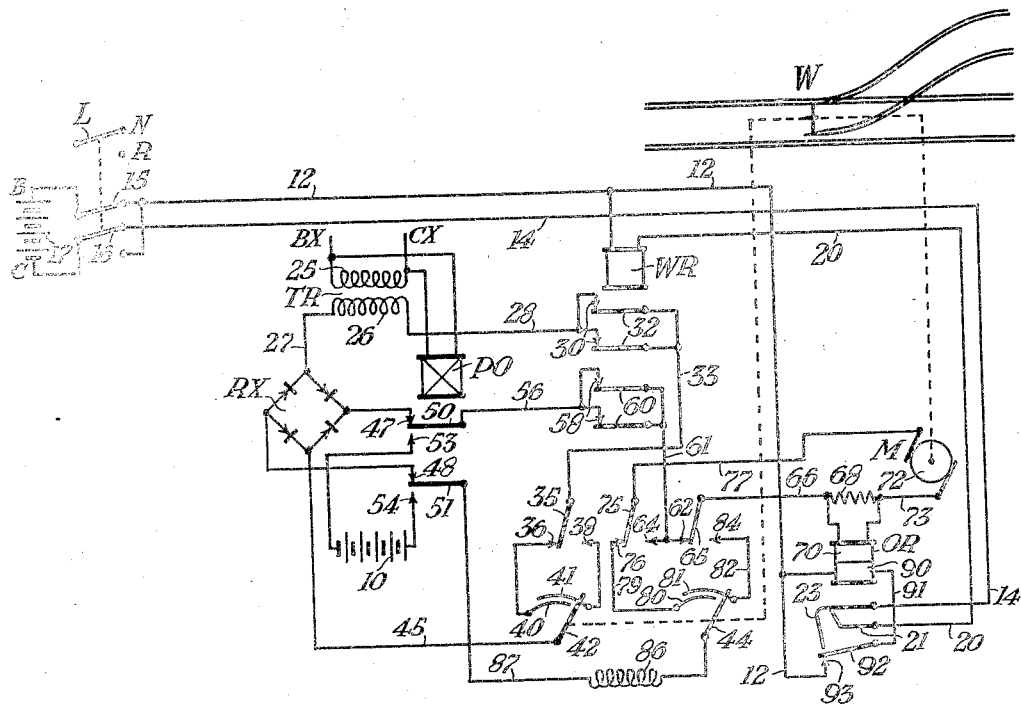
INVENTOR
Claude M. Hines.
BY
HIS  ATTORNEY Patented June 11, 1940

2,203,907

UNITED STATES PATENT OFFICE 2,203,907

MOTOR CONTROL SYSTEM

Claude M. Hines, Pittsburgh, Pa., assignor to The Union Switch & Signal Company, Swissvale, Pa., a corporation of Pennsylvania Application November 25, 1938, Serial No. 242,228

8 Claims. (Cl. 172—239)

My invention relates to a motor control system and particularly to a system adapted to be employed to energize a direct current motor with current supplied through a rectifier from a source of alternating current.

In some types of service, as for example the motors employed to operate railway track switches, it is desirable for purposes of reliability of operation to provide a source of current, such as a battery, local to the motor. However, current supplied from a battery is expensive and in order to reduce the cost of operation of the motor it is desirable to provide means to normally energize the motor from a commercial source of current, and to employ current from the battery only in the event of failure of the commercial source of power.

In order to employ the alternating current obtained from the commercial source of power to operate a direct current motor it is necessary to rectify the current. Motors for this type of service operate relatively infrequently and then only for relatively short periods of time. If the rectifier is supplied with alternating current only during those periods in which the motor is being operated, and, therefore, only during those periods in which rectified current is required, a much smaller rectifier may be employed than is required where the rectifier is continuously supplied with alternating current.

Furthermore, rectifiers permit some current leakage even when current is not taken from the output terminals of the rectifier, and if alternating current is continuously impressed on the rectifier, considerable power loss will result.

It is an object of my invention to provide an improved motor control system which is arranged to enable a motor to be normally operated by current supplied from a commercial source of current, and which incorporates means to effect operation of the motor from a local source of current, such as a battery, in the event of failure of the commercial source of current.

A further object of my invention is to provide a system of the type described in which a rectifier is employed to convert alternating current obtained from a commercial source of current into direct current for use in operating a motor, the system being arranged so that alternating current is supplied to the rectifier only during such periods that current is required from the rectifier output terminals.

Another object of my invention is to provide a system of the type described and which is arranged to permit the use of the standard types of motor overload protection equipment which have been developed for use with direct current motors.

A further object of my invention is to provide an improved motor control system of the type described in which on operation of the overload protection means incorporated in the system both the supply of alternating current to the rectifier and the supply of direct current from the rectifier or from the battery will be interrupted to thereby protect both the rectifier and the motor.

Another object of my invention is to provide a control system which may be employed with apparatus already in service, and which will make it possible to employ alternating current from a commercial source of power for normally operating a direct current motor, while providing an auxiliary source of current for operating the motor in the event of failure of the source of alternating current.

A further object of my invention is to provide an improved motor control system.

Other objects of my invention and features of novelty will be apparent from the following description taken in connection with the accompanying drawing.

I shall describe one form of motor control system embodying my invention and shall then point out the novel features thereof in claims.

In the drawing the single figure is a diagram of a motor control system embodying my invention.

In the drawing the reference character W designates a railway track switch which is movable between a normal position and a reverse position by means of an electric motor M. The motor M drives the switch W through suitable driving mechanism, not shown.

The motor M has associated therewith a polarized switch control relay WR, an overload relay OR, a power-off relay PO, a transformer TR, a rectifier RX, and a battery 10.

The switch control relay WR has a winding which is normally energized from control wires 12 and 14, while means is provided for supplying current of one or the other relative polarity to the control wires 12 and 14.

As shown, this means comprises a control lever L which is movable between a normal and a reverse position, and which has associated therewith movable contacts 15 and 16. Contact 15 is constantly connected to terminal B of a battery 17, while contact 16 is constantly connected to terminal C of battery 17.

In the normal position of the control lever L contact 15 engages a stationary contact to which is connected control wire 12, while contact 16 engages a stationary contact to which is connected control wire 14. Accordingly current of one relative polarity, which may be considered as normal polarity, is supplied to the control wires 12 and 14 at this time.

On movement of control lever L from the normal to the reverse position contact 15 is moved into engagement with the stationary contact to which is connected control wire 14, while contact 16 is moved into engagement with a stationary contact to which is connected a branch of control wire 12 with the result that in this position of the control lever L current of the opposite or reverse relative polarity is supplied from battery 17 to control wires 12 and 14.

Control wire 12 is connected to one terminal of the winding of switch control relay WR, while the other terminal of the relay winding is connected by wire 20 to stationary contact 21 of overload relay OR. The overload relay OR has a contact 23 to which is connected control wire 14, while contact 23 when released engages contact 21 and thereby establishes a circuit for energizing the winding of relay WR from control wires 12 and 14. The circuit for energizing the winding of relay WR includes wire 14, contacts 23—21 of relay OR, wire 20, winding of relay WR, and wire 12.

The transformer TR has a primary winding 25 which is connected to terminals BX and CX of a suitable source of alternating current. The transformer TR has a secondary winding 26, one terminal of which is connected by wire 27 to one input terminal of the rectifier RX, while the other terminal of the transformer secondary winding 26 is connected by wire 28 to contacts 30 of relay WR.

When the winding of relay WR is energized, the neutral contacts of this relay are picked up and neutral contacts 32 of the relay engage stationary contacts 30. Contacts 32 are connected by wire 33 to a polar contact 35 of relay WR, while contact 35 when in its normal position as shown engages normal polar contact 36, and in its reverse position engages reverse polar contact 38.

Contact 36 is connected to a contact 40, while contact 38 is connected to a contact 41. The switch W has associated therewith contacts 42 and 44 which are movable in accordance with movement of the switch W. Contact 42 is arranged so that it engages contact 40 in all positions of the switch W except the normal position thereof, while contact 42 engages contact 41 in all positions of the switch W except the reverse position thereof. Contact 42 is connected by wire 45 to an input terminal of the rectifier RX.

It will be seen, therefore, that the circuit for supplying alternating current from the transformer secondary winding 26 to the rectifier RX is controlled by neutral and polar contacts of relay WR as well as by switch operated contact 42.

One output terminal of the rectifier RX is connected to stationary contact 47 of relay PO, while the other rectifier output terminal is connected to stationary contact 48 of relay PO.

The power-off relay PO has a movable contact 50 which when picked up engages stationary contact 47, while the relay has a contact 51 which when picked up engages stationary contact 48.

Contact 50 when released engages a stationary contact 53 which is connected to one terminal of a local source of current, such as a battery 10, while contact 51 when released engages a stationary contact 54 which is connected to the other terminal of the battery 10.

The circuits for supplying current from the output terminals of the rectifier RX and from the battery 10 are arranged so that current of the same relative polarity is supplied from each source to the circuits controlled by the contacts 50 and 51 of power-off relay PO.

The power-off relay PO is provided with a winding the terminals of which are connected to the terminals of the transformer primary winding 25. As long as the transformer primary winding 25 is supplied with current, the winding of the power-off relay PO is energized and the contacts of the relay PO will be picked up to establish circuits leading from the rectifier RX. In the event of failure of the source of alternating current the winding of the power-off relay PO will no longer be energized and the contacts 50 and 51 of this relay will become released to establish the circuits leading from the battery 10.

Contact 50 of power-off relay PO is connected by a supply wire 56 to stationary contacts 58 associated with the relay WR. Contacts 58 are engaged at times by neutral contacts 60 of relay WR, while the contacts 60 are connected by means of wire 61 to a normal polar contact 62 and a reverse polar contact 64 of relay WR.

Relay WR has a polar contact 65 which when in its normal position as shown engages normal polar contact 62. Contact 65 is connected by wire 66 to one terminal of a resistance unit 68 and also to one terminal of the pick-up winding 70 of overload relay OR. The other terminals of the resistance unit 68 and of the pick-up winding 70 of relay OR are connected by wire 73 to one brush of the motor armature 72.

The relay WR has, in addition, a polar contact 75 which when in the normal position engages a normal polar contact 76, while the polar contact 75 is connected by a wire 77 to one brush of the motor armature 72.

Normal polar contact 76 is connected by wire 79 to a contact 80 associated with switch operated contact 44. The contact 44 also has associated therewith a contact 81 which is connected by wire 82 to reverse polar contact 84. Contact 80 is arranged so that it is engaged by contact 44 in all positions of the switch W except the normal position thereof, while contact 81 is arranged so that it is engaged by contact 44 in all positions of the switch W except the reverse position thereof.

Contact 44 has connected thereto one terminal of the motor field winding 86, while the other terminal of the field winding 86 is connected by supply wire 87 to contact 51 of power-off relay PO.

In addition to the pick-up winding 70 the overload relay OR is provided with a holding winding 90. One terminal of the holding winding 90 has connected thereto a branch of control wire 12, while the other terminal of the holding winding 90 is connected by wire 91 to movable contact 92 of the overload relay. Contact 92 when released engages a stationary contact 93 to which is connected a branch of control wire 12. Contact 92, therefore, when released establishes a shunt circuit for the holding winding 90 of relay OR. This shunt circuit is traced from one terminal of the holding winding 90 through wire 91, contacts 92—93 of relay OR, and wire 12 to the other terminal of the holding winding. The circuit shunting the holding winding 90 renders the relay OR slow in picking up and prevents undesired operation of the relay in response to momentary surges of current in the circuit of the switch motor.

The resistance unit 68 has a positive thermal coefficient of resistance, that is, the resistance of the unit increases as the temperature of the material of which it is constructed increases, while the resistance unit 68 and the pick-up winding 70 of overload relay OR are proportioned so that under normal conditions the preponderance of the current in the motor circuit flows through the resistance unit 68, and so little current flows in the circuit of the pick-up winding 70 that the contacts of the relay remain released.

In the event current of an unusually high value is present in the circuit of the motor M for an abnormally long period of time, as occurs when movement of the switch W is obstructed, the resistance unit 68 becomes heated and its resistance is increased with the result that flow of current in the pick-up winding 70 of relay OR is increased to such an extent that the contacts of the overload relay become picked up.

The equipment is shown in the drawing in the position which it assumes when the switch W and the control lever L are in their normal positions, the contacts of the power-off relay PO are picked up, and the contacts of the overload relay OR are released.

As the control relay L is in its normal position, current of normal relative polarity is supplied to the control wires 12 and 14, while the winding of the switch control relay WR is energized with current of normal relative polarity with the results that its neutral contacts 32 and 60 are picked up, while its polar contacts 35, 75 and 65 occupy their normal positions as shown. The circuit for energizing the winding of relay WR includes control wire 12, winding of relay WR, wire 20, contacts 21—23 of relay OR, and control wire 14.

At this time as the switch W is in its normal position, contact 42 does not engage contact 40, and, as a result, the circuit for supplying alternating current to the rectifier RX is interrupted.

As the contacts of the power-off relay PO are picked up, they establish connection from the output terminals of the rectifier RX to the supply wires 56 and 87 and interrupt connection from the terminals of battery 10 to the supply wires.

If at this time the operator wishes to effect movement of the switch W from the normal to the reverse position, he may do so by moving the control lever L from the normal to the reverse position. As a result of this movement of the control lever L, the supply of current of normal relative polarity to the control wires 12 and 14 is cut off and current of reverse relative polarity is supplied to these wires.

On the supply of current of reverse relative polarity to the wires 12 and 14 there is a corresponding change in the direction of energization of the winding of control relay WR with the result that the neutral contacts 32 and 60 of this relay become released and thereafter again become picked up, while the polar contacts 35, 75 and 65 of the relay are shifted from their normal to their reverse positions.

On movement of contact 35 from its normal to its reverse position a circuit is established to supply energy from the secondary winding 26 of transformer TR to the rectifier RX, this circuit including wire 28, neutral contacts 30—32 of relay WR, wire 33, reverse polar contacts 35—38 of relay WR, contact 41, switch operated contact 42, and wire 45 to one input terminal of the rectifier RX, while the other input terminal of the rectifier is connected by wire 27 to the other terminal of the transformer secondary winding 26.

As the rectifier RX is supplied with alternating current, the rectifier supplies direct current to its output terminals, while the contacts 50 and 51 of the power-off relay PO establish connection from the output terminals of the rectifier RX to the supply wires 56 and 87.

On movement of contacts 75 and 65 of relay WR from their normal to their reverse positions a circuit is established to energize the switch motor M with current from the supply wires 56 and 87 to effect operation of the motor M to drive the switch W from the normal to the reverse position.

The energizing circuit for the switch motor M is traced from supply wire 56 through neutral contacts 58—60 of relay WR, wire 61, reverse polar contacts 64—75 of relay WR, wire 77, motor armature 72, wire 73, resistance unit 68 and overload relay pick-up winding 70 in parallel, wire 66, reverse polar contacts 65—84 of relay WR, wire 82, contact 81, switch operated contact 44, motor field winding 86 to supply wire 87.

On movement of the switch W to the reverse position contact 42 is moved out of engagement with contact 41, thereby interrupting the previously traced circuit for supplying alternating current from the transformer secondary winding 26 to the rectifier RX, while contact 44 is moved out of engagement with contact 81 to thereby interrupt the circuit of the switch motor M. As a result, therefore, the motor M will cease to be operated.

The switch operated contact 42 and the associated stationary contacts 40 and 41 are arranged so that contact 42 is moved out of engagement with contact 41 slightly before contact 44 is moved out of engagement with contact 81. This insures that the supply of alternating current to the rectifier RX will be cut off, which necessarily results in deenergization of the motor M, before the energizing circuit of the motor M is interrupted by contact 44.

If contact 44 should operate to interrupt the circuit of the motor M before contact 42 interrupts the supply of alternating current to the rectifier RX, the motor M might cease to operate and the switch W cease to move before the switch W had been moved far enough to effect movement of the contact 42 out of engagement with contact 41 with the result that alternating voltage would continue to be supplied to the input terminals of the rectifier RX. This is undesirable since the rectifier RX is not designed to withstand continuous application of voltage thereto, and it might be injured if the supply of current thereto were not interrupted after each movement of the switch W.

In the system provided by this invention, however, since the switch operated contact 42 operates to interrupt the supply of alternating current to the rectifier RX before the circuit of the switch motor is interrupted, the supply of alternating current to the rectifier RX will be interrupted before operation of the motor M and movement of the switch W ceases.

If when the switch W is in the reverse position the operator desires to effect movement of the switch to the normal position, he may do so by returning the control lever L from the reverse to the normal position. On this movement of the control lever L contacts 15 and 16 are operated to cut off the supply of current of reverse relative polarity to the control wires 12 and 14 and to again effect the supply of current of normal relative polarity to the control wires.

On the supply of current of normal relative polarity to the control wires 12 and 14 there is a reversal in the direction of energization of the winding of relay WR with the result that the neutral contacts 32 and 60 of this relay first become released and thereafter again become picked up, while the polar contacts 35, 75 and 65 of the relay are shifted from their reverse to their normal positions.

On movement of polar contact 35 of relay WR to the reverse position at a time when the switch W is in the reverse position a circuit is established to supply alternating current from the transformer secondary winding 26 to the rectifier RX. This circuit is traced from one terminal of secondary winding 26 through wire 28, neutral contacts 30—32 of relay WR, wire 33, polar contacts 35—36 of relay WR, contact 40, switch actuated contact 42, and wire 45 to one terminal of the rectifier RX, the other input terminal of which is connected by wire 27 to the other terminal of the secondary winding 26.

On the supply of alternating current to the input terminals of the rectifier RX rectified current is supplied from the output terminals of the rectifier through contacts 50 and 51 of power-off relay PO to the supply wires 56 and 57.

On movement of the polar contacts 75 and 65 of switch control relay WR to their normal positions a circuit is established to energize the switch motor M from the supply wires 56 and 57 to effect operation of the motor to move the switch W to the normal position. The circuit for energizing the switch motor M is traced from supply wire 56 through neutral contacts 58—60 of relay WR, wire 61, normal polar contacts 62—65 of relay WR, wire 66, resistance unit 68 and overload relay pick-up winding 70 in parallel, wire 73, motor armature 72, wire 77, normal polar contacts 75—76 of relay WR, wire 79, contact 80, switch actuated contact 44, motor field winding 86, and supply wire 57.

When the switch W attains the normal position, contact 42 is moved out of engagement with contact 40 to thereby interrupt the circuit for supplying alternating current from the transformer secondary winding 26 to the input terminals of the rectifier RX. Similarly, on movement of the switch W to the normal position contact 44 is moved out of engagement with the contact 80 to interrupt the circuit for energizing the switch motor M.

As previously explained, contact 42 is arranged so that it is moved out of engagement with contact 40 to thereby interrupt the circuit for supplying alternating current to the rectifier RX slightly before contact 44 is moved out of engagement with contact 80 to interrupt the switch motor circuit. This insures that the supply of alternating current to the rectifier will be interrupted.

The overload relay OR incorporated in this system operates in the event of an overload of the switch motor M to interrupt the circuit of the switch control relay WR and thereby cause the relay WR to interrupt the circuit of the switch motor, and to also interrupt the circuit for supplying alternating current to the rectifier RX.

On the occurrence of an overload, such as is caused by an obstruction to movement of the switch W, there is an abnormally heavy current flowing in the circuit of the switch motor for an unusually long time interval and the resistance unit 68 becomes heated. As a result its resistance increases and there is such an increase in the flow of current in the pick-up winding 70 of overload relay OR that the contacts of this relay become picked up.

For purposes of illustration it will be assumed that the switch W is in the normal position and is being moved to the reverse position at the time the overload occurs. As the switch W is being moved to the reverse position, the polar contacts 35, 75 and 65 of switch control relay WR are in their reverse positions and the previously traced circuit for energizing the switch motor M is established by the contacts of the relay WR.

On the occurrence of the overload and picking up of the contacts of relay OR contact 92 is moved out of engagement with contact 93, thereby interrupting the previously traced circuit shunting the holding winding 90, while on further upward movement of the contact 92 it engages contact 23 to establish a circuit for energizing the holding winding 90 with current supplied from the control wires 12 and 14. This circuit is traced from control wire 12 through holding winding 90, wire 91, and contacts 92—23 of overload relay OR to control wire 14.

The holding winding 90 and the pick-up winding 70 are arranged so that when both are energized they assist each other, and, accordingly, on energization of the holding winding 90 of overload relay OR the contacts of the relay are moved all of the way to their picked up positions and are thereafter held in that position by the overload relay holding winding 90.

On movement of the contact 92 of overload relay OR to its picked up position contact 23 is moved out of engagement with contact 21, thereby interrupting the circuit of the winding of the switch control relay WR.

On deenergization of the winding of the switch control relay WR the neutral contacts 32 and 60 of this relay become released. On release of contacts 32 the circuit for supplying alternating current from the transformer secondary winding 26 to the rectifier RX is interrupted, while on release of contacts 60 of relay WR the circuit of the switch motor M is interrupted. Accordingly the motor M ceases to operate and as the supply of current to the motor is cut off, there is no danger of injury to the motor which would result from its continued energization at a time when it is overloaded.

Similarly, as the supply of alternating current to the rectifier RX is interrupted at this time, there is no possibility of injury to the rectifier as a result of continued supply of alternating current thereto.

If following the occurrence of the obstruction to movement of the switch W and resultant picking up of the contacts of the overload relay OR the operator wishes to return the switch to the position from which it was being moved when the overload occurred, in this case the normal position, he may do so by moving the control lever L from the reverse to the normal position.

On movement of the control lever L from the reverse to the normal position there is a reversal in the direction of energization of the control wires 12 and 14, and, therefore, in the direction of energization of the holding winding 90 of overload relay OR. As a result of this reversal in the direction of energization of holding winding 90 of relay OR, the contacts of the relay become released and contact 92 is moved out of engagement with contact 23, thereby interrupting the circuit of the holding winding 90 so that once the circuit of the winding is interrupted, the contacts of the relay will not thereafter become picked up.

On release of contact 92 of overload relay OR contact 23 moves into engagement with contact 21, thereby reestablishing the circuit for energizing the winding of the switch control relay WR from the control wires 12 and 14. On the supply of current of normal relative polarity to the winding of relay WR the neutral contacts of the relay become picked up, while the polar contacts of the relay are shifted from their reverse to their normal positions.

At this time the switch W is assumed to be in mid stroke and accordingly switch operated contact 42 engages contact 40, while switch operated contact 44 engages contact 80. On picking up of the neutral contacts of the relay WR and on movement of the polar contacts of the relay to their normal positions the previously traced circuit for supplying alternating current from the transformer secondary winding 26 to the rectifier RX is established, while the previously traced circuit is established to supply current from the supply wires 56 and 87 to energize the switch motor M to move the switch W to the normal position.

When the switch W attains the normal position, switch operated contact 42 interrupts the circuit for supplying alternating current to the rectifier RX, while switch operated contact 44 interrupts the circuit of the switch motor as previously explained.

The system provided by my invention operates in a similar manner if movement of the switch W is obstructed at a time when the switch is being moved from the reverse to the normal position. Under these circumstances, the contacts of the overload relay OR become picked up as previously explained with the result that the circuit of the winding of the switch control relay WR is interrupted. On interruption of the circuit of the winding of relay WR the neutral contacts 32 and 60 of this relay become released to interrupt the circuit for supplying alternating current to the rectifier RX and to also interrupt the circuit of the switch motor M.

As previously explained following obstruction to movement of the switch W and resultant picking up of the contacts of the overload relay OR, the operator may return the switch to the position from which it was being moved when the obstruction occurred, in this case the reverse position. In order to effect this movement of the switch W the control lever L is returned to the reverse position and on the resultant reversal in the polarity of the current supplied to the control wires 12 and 14 the contacts of the overload relay OR become released and reestablish the circuit of the winding of the switch control relay WR which thereupon operates to reestablish the circuit for the switch motor M to cause the motor M to move the switch W to the reverse position.

The system provided by my invention is arranged so that in the event of failure of the source of alternating current a circuit will be automatically established to supply current from the battery 10 to effect operation of the motor M as long as the supply of alternating current is interrupted, while the entire system, including the overload protection means, will operate in the same manner as when current is supplied from the source of alternating current.

In the event of failure of the source of alternating current the winding of the power-off relay PO will be deenergized and the contacts 50 and 51 of this relay will move from their picked up to their released positions, thereby interrupting connection from the rectifier RX to the supply wires 56 and 87, and establishes connection from the battery 10 to the supply wires 56 and 87. As long as the supply of alternating current is interrupted, the contacts of the power-off relay will continue to establish connection from the battery 10 to the supply wires. On restoration of the supply of alternating current the winding of power-off relay PO is again energized and the contacts of the relay become picked up to interrupt the circuit for supplying current from the battery 10 to the supply wires 56 and 87, while the supply wires are again connected to the output terminals of the rectifier RX which is again capable of supplying rectified current as soon as alternating current is supplied to it.

In operation the system functions in substantially the same manner when current is supplied by battery 10 as when current is supplied to the supply wires from the rectifier RX. When current is supplied to the supply wires 56 and 87 from the battery 10 the switch actuated contact 44 operates to interrupt the circuit of the switch motor and prevents further operation of the motor on movement of the switch W to either of its positions. At these times the contact 42 is actuated by the switch W, but since no current is present in the transformer secondary winding 26 movement of the contact 42 is without effect.

In the event of an overload at a time when current is supplied from the battery 10 to the supply wires 56 and 87 the overload relay OR operates as previously described to interrupt the circuit of the winding of the switch control relay WR, while the neutral contacts 60 of the relay become released and interrupt the circuit of the switch motor M and thus prevents injury to the motor.

Although I have herein shown and described only one form of motor control system embodying my invention, it is understood that various changes and modifications may be made therein within the scope of the appended claims without departing from the spirit and scope of my invention.

Having thus described my invention, what I claim is:

1. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a source of alternating current, a rectifier operative on the supply of alternating current thereto to supply direct current to said supply conductors, a control device having a normal condition and a reverse condition, said device being operative when in the normal condition to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said device being operative when in the reverse condition to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, and means for selectively causing said control device to assume its normal or its reverse condition, the first normal contact being opened slightly in advance of the second normal contact on movement of the driven member to the normal position, the first reverse contact being opened slightly in advance of the second reverse contact on movement of the driven member to the reverse position.

2. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a source of alternating current, a rectifier operative on the supply of alternating current thereto to supply direct current to said supply conductors, a control device having a normal condition and a reverse condition, said device being operative when in the normal condition to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said device being operative when in the reverse condition to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, means for selectively causing said control device to assume its normal or its reverse condition, a source of direct current, and a power-all relay energized from said source of alternating current, said power-off relay being operative when and only when energized to establish connection from the rectifier to said supply conductors, said power-off relay being operative when and only when deenergized to establish connection from said source of direct current to said supply conductors.

3. In a motor control system, in combination, a direct current motor, a pair of supply conductors through which current may be supplied to the motor, a rectifier for converting alternating current into direct current, a source of alternating current, a source of direct current, a power-off relay energized from said source of alternating current, said relay being operative when and only when deenergized to establish a circuit to supply current from the direct current source to said supply conductors, means for supplying current from said rectifier to said supply conductors, a control device controlling a circuit for supplying alternating current from said alternating current source to said rectifier and also controlling a circuit for supplying current from said supply conductors to said motor, and means responsive to the value of the current taken by the motor and also controlling the circuit for supplying alternating current to the rectifier and the circuit for supplying current from the supply conductors to the motor.

4. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a source of alternating current, a rectifier operative on the supply of alternating current thereto to supply direct current to said supply conductors, a control device having a normal condition and a reverse condition, said device being operative when in the normal condition to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said device being operative when in the reverse condition to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, means for selectively causing said control device to assume its normal or its reverse condition, a source of direct current, and a power-off relay energized from said source of alternating current, said power-off relay being operative when and only when deenergized to establish connection from said source of direct current to said supply conductors.

5. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a source of alternating current, a rectifier operative on the supply of alternating current thereto to supply direct current to said supply conductors, a control device having a normal condition and a reverse condition, said device being operative when in the normal condition to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said device being operative when in the reverse condition to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, means for selectively causing said control device to assume its normal or its reverse condition, a source of direct current, and a power-off relay energized from said source of alternating current, said power-off relay being operative when and only when deenergized to establish connection from said source of direct current to said supply conductors, the first normal contact being opened slightly in advance of the second normal contact on movement of the driven member to the normal position, the first reverse contact being opened slightly in advance of the second reverse contact on movement of the driven member to the reverse position.

6. In a motor control system, in combination, a direct current motor, a pair of supply conductors through which current may be supplied to the motor, a rectifier for converting alternating current into direct current, a source of alternating current, a source of direct current, a power-off relay energized from said source of alternating current, said relay being operative when and only when deenergized to establish a circuit to supply current from said direct current source to said supply conductors, means for supplying current from said rectifier to said supply conductors, a control relay operative when and only when energized to establish a circuit to supply current from said alternating current source to said rectifier and to also establish a circuit to supply current from said supply conductors to said motor, a control circuit for supplying energy to said control relay, and means responsive to the value of the current taken by said motor and controlling said control circuit.

7. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a rectifier operative on the supply of alternating current thereto to supply direct current to said supply conductors, a source of alternating current, control means having a first condition, a second condition and a third condition, said control means being operative when in its first condition to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said control means being operative when in its second condition to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, said control means being operative when in its third condition to interrupt the circuits for supplying alternating current to the rectifier and for energizing the motor from said supply conductors, means for selectively causing said control means to assume either one of its three conditions, a source of direct current, a power-off relay energized from said source of alternating current, said power-off relay being operative when and only when deenergized to establish connection from said source of direct current to said supply conductors, and an overload device responsive to the value of the current taken by said motor, said overload device being operative when the current taken by the motor exceeds a predetermined value to cause said control means to assume its third condition.

8. In a motor control system, in combination, a driven member movable between a normal and a reverse position, a first and a second normal contact, a first and a second reverse contact, the normal contacts being open only when the driven member is in the normal position and the reverse contacts being open only when the driven member is in the reverse position, a direct current motor for moving said driven member between its two positions, a pair of supply conductors, a rectifier operative on the supply of alternating current thereto to supply direct current to said supply conductors, a polarized control relay having neutral and polar contacts, said relay neutral contacts being picked up when the relay winding is supplied with energy of either polarity, said relay being operative when supplied with energy of normal relative polarity to establish a circuit including the first normal contact in series therewith for supplying current to the rectifier from the alternating current source and to also establish a normal supply circuit including the second normal contact in series therewith for energizing the motor from said supply conductors to cause the motor to move the driven member to the normal position, said relay being operative when supplied with energy of reverse relative polarity to establish a circuit including the first reverse contact in series therewith for supplying current to the rectifier from the alternating current source and to also establish a reverse supply circuit including the second reverse contact in series therewith for energizing the motor from said supply conductors to cause the motor to move the driven member to the reverse position, said control relay neutral contacts being operative when the relay winding is not energized to interrupt the circuits for supplying current to the rectifier from the alternating current source and to also interrupt the circuits for supplying current from the supply conductors to the motor, a control circuit for supplying current to the winding of said control relay, means for selectively supplying to said control circuit current of one or the other relative polarity, a source of direct current, a power-off relay energized from said source of alternating current, said power-off relay being operative when and only when deenergized to establish connection from said source of direct current to said supply conductors, and an overload device responsive to the value of the current taken by said motor, said overload device being operative when the current taken by the motor exceeds a predetermined value to interrupt the supply of current from said control circuit to the winding of said control relay.

CLAUDE M. HINES.